US011295169B2

United States Patent
Park

(10) Patent No.: US 11,295,169 B2
(45) Date of Patent: Apr. 5, 2022

(54) METHOD, DEVICE, AND PROGRAM FOR SAMPLING FRAME IMAGE OF OBJECT TO BE LEARNED IN VIDEO FOR ARTIFICIAL INTELLIGENCE VIDEO LEARNING, AND IMAGE LEARNING METHOD THEREOF

(71) Applicant: CROWDWORKS INC., Seoul (KR)

(72) Inventor: Min Woo Park, Seongnam-si (KR)

(73) Assignee: CROWDWORKS INC., Seoul (KR)

( * ) Notice: Subject to any disclaimer, the term of this patent is extended or adjusted under 35 U.S.C. 154(b) by 0 days.

(21) Appl. No.: 17/212,771

(22) Filed: Mar. 25, 2021

(65) Prior Publication Data

US 2021/0241031 A1    Aug. 5, 2021

Related U.S. Application Data

(63) Continuation of application No. PCT/KR2019/008402, filed on Jul. 9, 2019.

(30) Foreign Application Priority Data

Sep. 27, 2018 (KR) .......................... 10-2018-0114986

(51) Int. Cl.
*G06K 9/62* (2022.01)
*G06T 7/215* (2017.01)
(Continued)

(52) U.S. Cl.
CPC ............. *G06K 9/6256* (2013.01); *G06N 5/04* (2013.01); *G06N 20/00* (2019.01); *G06T 7/194* (2017.01);
(Continued)

(58) Field of Classification Search
None
See application file for complete search history.

(56) References Cited

U.S. PATENT DOCUMENTS

2017/0185872 A1*  6/2017  Chakraborty ............ G06K 9/66
2019/0244366 A1*  8/2019  Yu .......................... G06N 3/0454
(Continued)

FOREIGN PATENT DOCUMENTS

JP    H09-044681 A    2/1997
JP    2014-085795 A   5/2014
(Continued)

OTHER PUBLICATIONS

International Search Report issued in PCT/KR2019/008402; dated Oct. 14, 2019.
(Continued)

*Primary Examiner* — Vikkram Bali
(74) *Attorney, Agent, or Firm* — Studebaker & Brackett PC

(57) ABSTRACT

Provided is a method, device, and program for sampling a frame image of an object to be learned in a video for artificial intelligence video learning, and an image learning method thereof. The method includes receiving a raw video for the AI image learning, extracting a predetermined number of frame images from the received raw, detecting learning target objects in each of the frame images, removing a background other than the learning target objects from each of the frame images, measuring a movement amount of each of the detected learning target objects in a n-th frame image, from which the background is removed, and selecting the n-th frame image as the learning target frame image, by comparing a result of measuring the movement amount of each of the detected one or more learning target objects in the n-th frame image with a predetermined reference.

7 Claims, 7 Drawing Sheets

(51) Int. Cl.
  *G06T 7/194*      (2017.01)
  *G06N 20/00*      (2019.01)
  *G06N 5/04*       (2006.01)
  *G06V 20/40*      (2022.01)

(52) U.S. Cl.
  CPC .............. *G06T 7/215* (2017.01); *G06V 20/46* (2022.01); *G06T 2207/10016* (2013.01); *G06T 2207/20081* (2013.01); *G06V 2201/07* (2022.01)

(56) References Cited

U.S. PATENT DOCUMENTS

2019/0246130 A1* 8/2019 Sheikh ................ H04N 19/102
2021/0217179 A1* 7/2021 Li ....................... G06K 9/00771

FOREIGN PATENT DOCUMENTS

| | | |
|---|---|---|
| JP | 2015-138319 A | 7/2015 |
| JP | 2017-151813 A | 8/2017 |
| JP | 2018-036848 A | 3/2018 |
| JP | 2018-081545 A | 5/2018 |
| KR | 10-2014-0022676 A | 2/2014 |
| KR | 10-1537559 B1 | 7/2015 |
| KR | 10-2018-0096164 A | 8/2018 |
| KR | 10-1888647 B1 | 8/2018 |

OTHER PUBLICATIONS

Office Action issued in JP 2019-012692; mailed by the Japanese Patent Office dated Feb. 12, 2020.

\* cited by examiner

METHOD, DEVICE, AND PROGRAM FOR SAMPLING FRAME IMAGE OF OBJECT TO BE LEARNED IN VIDEO FOR ARTIFICIAL INTELLIGENCE VIDEO LEARNING, AND IMAGE LEARNING METHOD THEREOF

CROSS-REFERENCE TO RELATED APPLICATIONS

The present application is a continuation of International Patent Application No. PCT/KR2019/008402, filed on Jul. 9, 2019, which is based upon and claims the benefit of priority to Korean Patent Application No. 10-2018-0114986 filed on Sep. 27, 2018. The disclosures of the above-listed applications are hereby incorporated by reference herein in their entirety.

BACKGROUND

Embodiments of the inventive concept described herein relate to a method, device, and program for sampling a frame image of an object to be learned (hereinafter, referred to as a "learning target frame image") in a video for artificial intelligence video learning, and an image learning method thereof.

Artificial intelligence (AI) refers to intelligence created by machines. The AI belongs to a field of computer science and information technology of studying a method of allowing a computer to be capable of thinking, learning, or the like that is capable of being done with human intelligence, and means that an intelligent behavior of humans is imitated by the computer.

The AI is being constantly researched and developed, and is being researched and developed from image intelligence to voice and text intelligence. Nowadays, research and development on video image intelligence is rapidly being made. Accordingly, the industrial impact of the video image intelligence has a great effect.

In a process of generating learning data for AI learning, a task of preprocessing the obtained data takes about 70-80% of the time to generate learning data.

Furthermore, the amount of video image data differs from the amount of conventional image data or the amount of conventional voice data by tens to hundreds of times.

SUMMARY

As compared with generating learning data using a conventional image or voice data, generating learning data using video image data may significantly increase a time and cost in a task of preprocessing data because of the vast data capacity.

Embodiments of the inventive concept provide a method for sampling a learning target frame image in a video for AI image learning that is capable of minimizing a time and cost in a task of preprocessing data.

The technical problems to be solved by the present inventive concept are not limited to the aforementioned problems, and any other technical problems not mentioned herein will be clearly understood from the following description by those skilled in the art to which the inventive concept pertains.

According to an embodiment, a method of sampling a learning target frame image in a video for artificial intelligence (AI) image learning that is performed by a computer includes receiving a raw video for the AI image learning, extracting a predetermined number of frame images from the received raw video per predetermined time interval, detecting one or more learning target objects, each of which has one or more predetermined types, in each of the frame images by using an object detection algorithm, removing a background other than the learning target objects from each of the frame images, measuring a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image, and selecting the n-th frame image as the learning target frame image, by comparing a result of measuring the movement amount of each of the detected one or more learning target objects in the n-th frame image with a predetermined reference.

The selecting of the n-th frame image as the learning target frame image includes selecting the n-th frame image as the learning target frame image when a movement amount of each of the learning target objects, of which the number is not less than a predetermined number, from among the detected one or more learning target objects is not less than the predetermined reference, and otherwise, not selecting the n-th frame image as the learning target frame image.

According to an embodiment, the method of sampling a learning target frame image in the video for AI image learning further includes generating a learning video set by processing the selected learning target frame image.

The learning target frame image in the generating of the learning video set is a frame image before the one or more learning target objects are detected in the extracting of the predetermined number of the frame images. The generating of the learning video set includes detecting the one or more learning target objects, each of which has the one or more predetermined types, in the learning target frame image and annotating the detected one or more learning target objects in the learning target frame image.

The learning target frame image in the generating of the learning video set is a frame image, in which the one or more learning target objects are detected in the detecting of the one or more learning target objects. The generating of the learning video set includes annotating the detected one or more learning target objects in the learning target frame image.

According to an embodiment, an AI image learning method that is performed by a computer includes a step of performing AI image learning by using a learning video set. The learning video set is generated by a method of sampling a learning target frame image in a video for AI image learning including receiving a raw video for the AI image learning, extracting a predetermined number of frame images from the received raw video per predetermined time interval, detecting one or more learning target objects, each of which has one or more predetermined types, in each of the frame images by using an object detection algorithm, removing a background other than the learning target objects from each of the frame images, measuring a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image, selecting the n-th frame image as the learning target frame image, by comparing a result of measuring the movement amount of each of the detected one or more learning target objects in the n-th frame image with a predetermined reference, and generating a learning video set by processing the selected learning target frame image.

According to an embodiment, a device for sampling a learning target frame image in a video for AI image learning includes a raw video receiving unit receiving a raw video for the AI image learning, a frame image extracting unit extracting a predetermined number of frame images from the received raw video per predetermined time interval, a learning target object detecting unit detecting one or more learning target objects, each of which has one or more predetermined types, in each of the frame images by using an object detection algorithm, a background removing unit removing a background other than the learning target objects from each of the frame images, an object movement amount measuring unit measuring a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image, and a learning target frame image selecting unit selecting the n-th frame image as the learning target frame image, by comparing a result of measuring the movement amount of each of the detected one or more learning target objects in the n-th frame image with a predetermined reference.

According to an embodiment, the device for sampling a learning target frame image in a video for AI image learning further includes a learning video set generating unit generating a learning video set by processing the selected learning target frame image.

According to an embodiment, an AI image learning device includes an AI image learning executing unit performing AI image learning by using a learning video set. The learning video is generated by a device for sampling a learning target frame image in a video for AI image learning including a raw video receiving unit receiving a raw video for the AI image learning, a frame image extracting unit extracting a predetermined number of frame images from the received raw video per predetermined time interval, a learning target object detecting unit detecting one or more learning target objects, each of which has one or more predetermined types, in each of the frame images by using an object detection algorithm, a background removing unit removing a background other than the learning target objects from each of the frame images, an object movement amount measuring unit measuring a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image, a learning target frame image selecting unit selecting the n-th frame image as the learning target frame image, by comparing a result of measuring the movement amount of each of the detected one or more learning target objects in the n-th frame image with a predetermined reference, and a learning video set generating unit generating a learning video set by processing the selected learning target frame image.

According to an embodiment, a program for sampling a learning target frame image of a video for AI image learning that is stored in a recording medium to execute one method of the methods by using a computer that is hardware.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
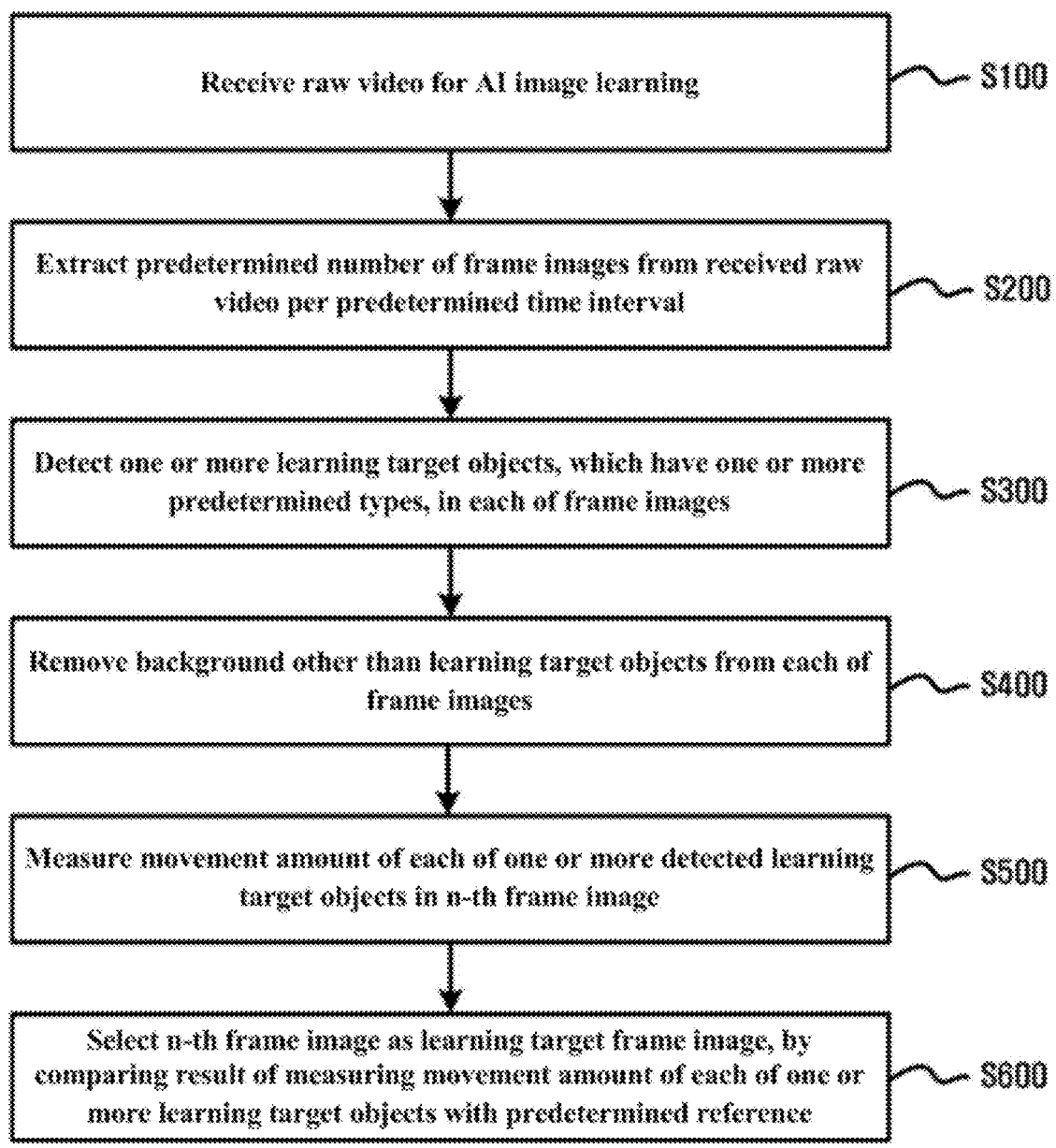
FIG. 1 is a flowchart for describing a method for sampling a learning target frame image in a video for AI image learning according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the concept of the inventive concept to those skilled in the art. The inventive concept may be defined by scope of the claims.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the device in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

Hereinafter, embodiments of the inventive concept will be described in detail with reference to accompanying drawings.

FIG. 1 is a flowchart for describing a method for sampling a learning target frame image in a video for AI image learning according to an embodiment of the inventive concept.

Referring to FIG. 1, according to an embodiment of the inventive concept, a method for sampling a learning target frame image in a video may include a raw video receiving step S100 that receives a raw video for AI image learning, a frame image extracting step S200 that extracts the predetermined number of frame images from the received raw video per predetermined time interval, a step S300 of detecting a learning target object, which detects one or more learning target objects, each of which has one or more predetermined types, on each of the frame images, a background removing step S400 that removes a background other than the learning target objects from each of the frame images, a step S500 of measuring a movement amount of a learning target object, which measures a movement amount of each of the one or more learning target objects in a n-th frame image, and a step S600 of selecting a learning target frame image, which selects the n-th frame image as a learning target frame image, by comparing a result of measuring a movement amount of each of the one or more learning target objects with a predetermined reference.

In the step S100 of receiving a raw video, the raw video includes the video collected by various cameras or the like.

In an embodiment, when the raw video is received to generate AI image learning data for autonomous driving of a vehicle, the raw video includes all videos capable of generating learning data for autonomous driving, such as a black box image for a vehicle, a CCTV image that captures a road on which a vehicle is driving, or a video obtained from a camera attached to a vehicle to generate learning data for autonomous driving, and is not limited to the above example.

In another embodiment, when the raw video is received to generate AI image learning data for diagnosing lesions or diseases, the raw video includes all videos obtained by various imaging medical devices, for example, a computer tomography (CT) image, nuclear magnetic resonance computed tomography (NMR-CT), positron emission tomography (PET), conebeam CT (CBCT), electron beam tomography, X-ray, magnetic resonance imaging, and the like, and is not limited to the above example.

In another embodiment, when the raw video is received to generate AI image learning data to detect crime scenes, the raw video includes the video obtained by CCTV installed in the public and CCTV installed by individuals.

The step S200 of extracting a frame image may extract the predetermined number of frame images from the received raw video by a computer or user settings.

The extracting of the predetermined number of frame images from the received raw video refers to extracting the predetermined number of frames in a predetermined time interval. For example, a computer may extract 30 frames per second or 60 frames per second. All frames extracted depending on predetermined criteria by a user or the computer may be included therein, and is not limited to the above example.

The step S300 of detecting a learning target object refers to extracting a learning target object for each of the extracted frame images, and may detect one or more learning target objects from each of the extracted frame images. The learning target object has one or more types.

The types of the learning target objects include, for example, people, vehicles, bicycles, buildings, power poles, motorcycles, trees, flowers, dogs, cats, roads, traffic signs, speed bumps, traffic cones, lines, and the like, and is not limited to the above example. The types of the learning target objects include all distinguishable things as objects.

The types of the learning target objects include, for example, a front surface, a back surface, a right surface, a left surface, and the like, and are not limited to the example. The types of the learning target objects may be classified by subdividing the types of the learning target objects as compared to the type of the example. The types of the learning target objects may be classified as a completely different type from the type of the example.

The detecting of one or more objects having one or more types in the step S300 of detecting a learning target object refers to detecting the one or more objects by using an object detection algorithm. The object detection algorithm includes, for example, an R-CNN model.

The step S400 of removing a background may process things other than the detected learning target objects in the extracted frame image as a background and then may remove all backgrounds.

In an embodiment, a method of removing a background from a frame image may process an area corresponding to a background as '0' or '1' and then may remove the background.

The step S500 of measuring a movement amount of a learning target object may include measuring a movement amount of each of the detected one or more learning target objects in a n-th frame image (e.g., 'n' is a natural number of 2 or more) by comparing a location of each of the detected one or more learning target objects in a n-th frame image, from which the background is removed, with a location of each of the detected one or more learning target objects in a (n−1)-th frame image, from which the background is removed, immediately before the n-th frame image.

The detailed embodiment of measuring a movement amount of a learning target object will be described later with reference to FIGS. 2A and 2B.

The step S600 of selecting a learning target frame image may compare a result of measuring a movement amount of each of the one or more detected learning target objects in the n-th frame image with a predetermined reference and then may select the n-th frame image as the learning target frame image.

The detailed method for selecting a learning target frame image will be described later with reference to FIGS. 3 and 4.

Figure 2A:
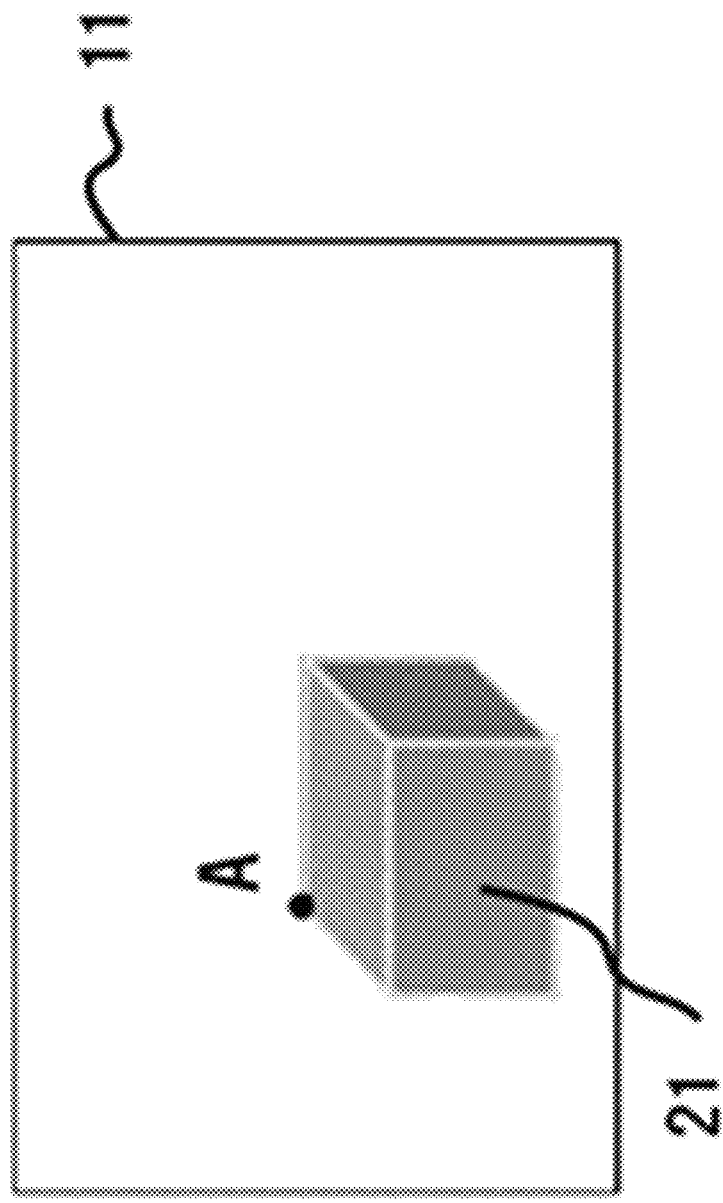
FIGS. 2A and 2B are diagrams for describing a method for measuring a movement amount of a learning target object according to an embodiment of the inventive concept.
Figure 2B:
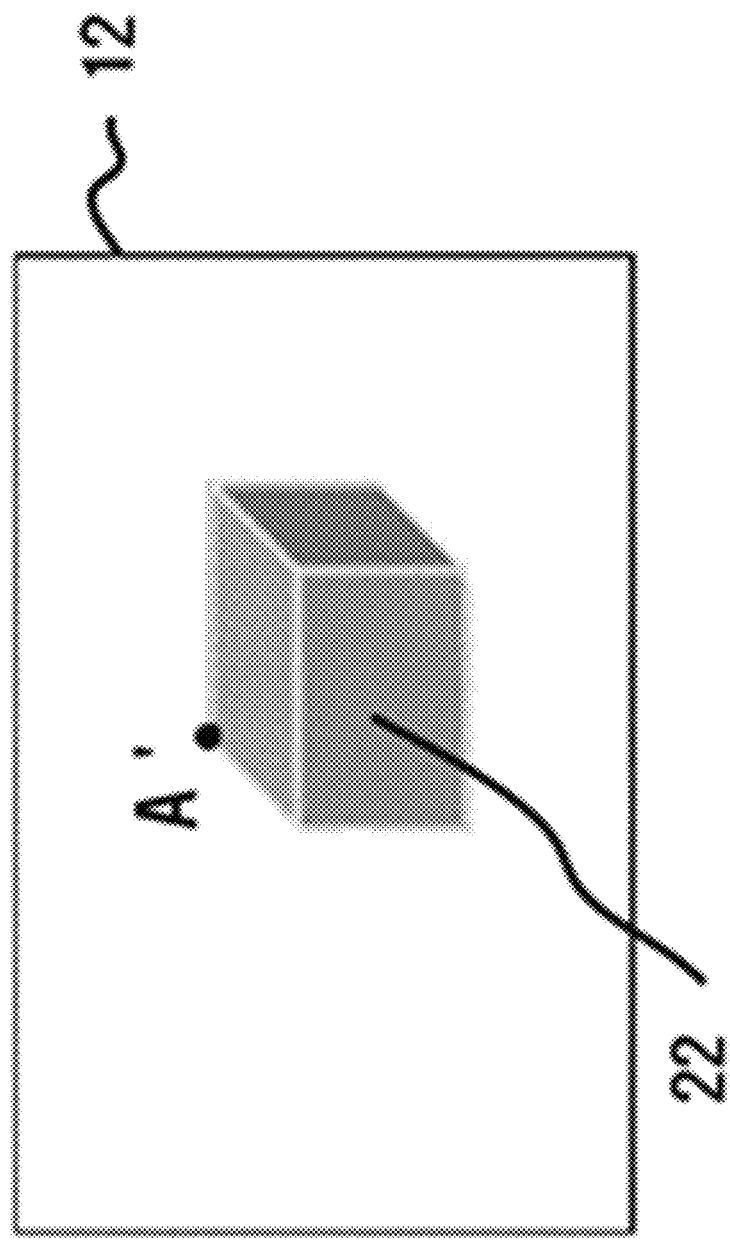

FIGS. 2A and 2B are diagrams for describing a method for measuring a movement amount of a learning target object according to an embodiment of the inventive concept.

Referring to FIGS. 2A and 2B, a method of measuring a movement amount in the step S500 of measuring a movement amount of a learning target object will be described.

FIG. 2A illustrates a (n-1)-th frame image 11. FIG. 2B illustrates an n-th frame image 12.

The measuring of the movement amount of the learning target object refers to comparing a location of a learning target object 21 in the (n-1)-th frame image 11 with a location of a learning target object 22 in the n-th frame image 12.

The learning target object 21 in the (n-1)-th frame image 11 and the learning target object 22 in the n-th frame image 12 have the same shape, and a portion corresponding to the same location of the learning target object is first selected.

Assuming that a computer selects a specific portion as A in the learning target object 21 in the (n-1)-th frame image 11, in selecting the portion corresponding to the same location of the learning target object, the computer selects the portion corresponding to the same location as 'A' on the learning target object 22 on the n-th frame image 12 as A'.

After selecting the portion corresponding to the same location of the learning target object, the computer places the (n-1)-th frame image 11 and the n-th frame image 12 on the same plane, and then extracts coordinates A and coordinates A'.

The computer extracts coordinates A and coordinates A' and then measures a movement amount by using a difference between coordinates A and coordinates A'.

Figure 3:
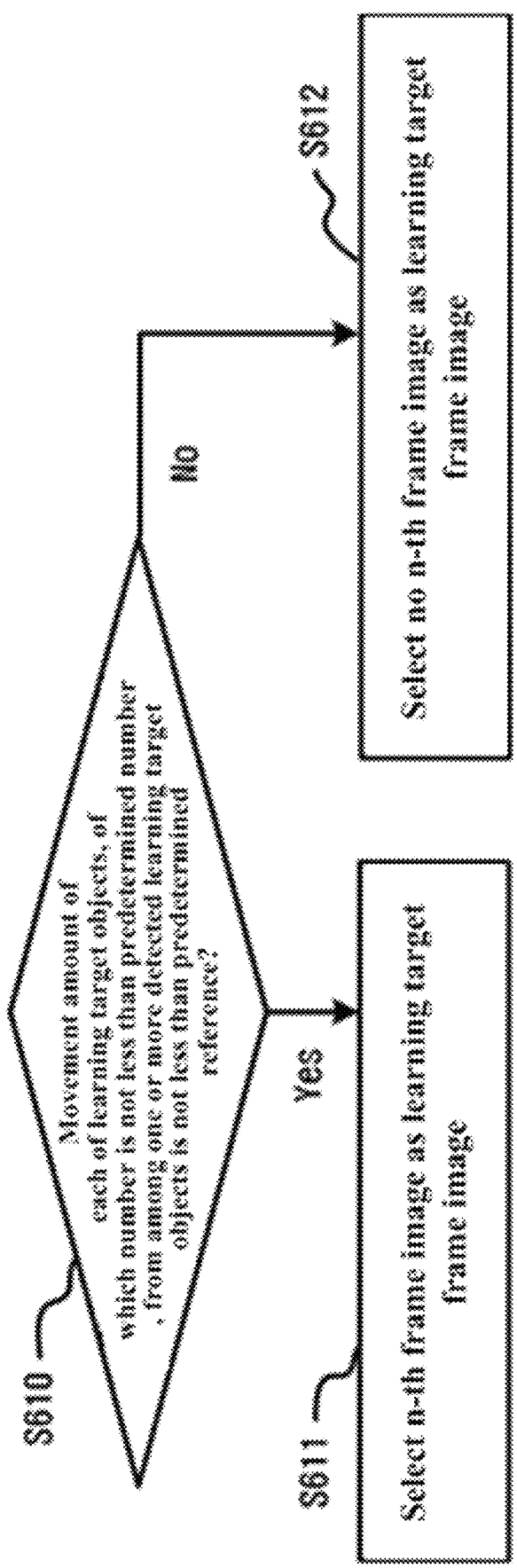
FIG. 3 is a diagram for describing a method of selecting a learning target frame image according to an embodiment of the inventive concept.

FIG. 3 is a diagram for describing a method of selecting a learning target frame image according to an embodiment of the inventive concept.

Referring to FIG. 3, a method of selecting a learning target frame image includes determining whether a movement amount of each of learning target objects, of which the number of is not less than a predetermined number, from among the detected one or more learning target objects is not less than a predetermined reference (S610), selecting a n-th frame image as a learning target frame image (S611) when the movement amount of each of one or more objects, of which the number of is not less than the predetermined number, from among the detected one or more learning target objects is not less than the predetermined reference, and not selecting a n-th frame image as a learning target frame image (S612) when the movement amount of each of one or more objects, of which the number of is not less than the predetermined number, from among the detected one or more learning target objects is not greater than or equal to the predetermined reference.

Unnecessary data may be reduced and only necessary data may be selected by setting the reference of a movement amount of a learning target object so as to select only a frame image, in which the movement amount of a learning target object is not less than a predetermined reference, as a learning target frame image.

Accordingly, in the learning target frame image, all of the extracted frame images are not selected as a learning target frame image, and only the remaining pieces of data other than pieces of data, which have little effect on learning because the amount of movement of the object is small, is selected as a learning target frame image. Accordingly, the learning target frame image may be generated quickly and accurately despite the vast amount of a learning data set.

Furthermore, the learning data set is generated by removing unnecessary data from the learning data set, thereby reducing the time required for learning.

Figure 4:
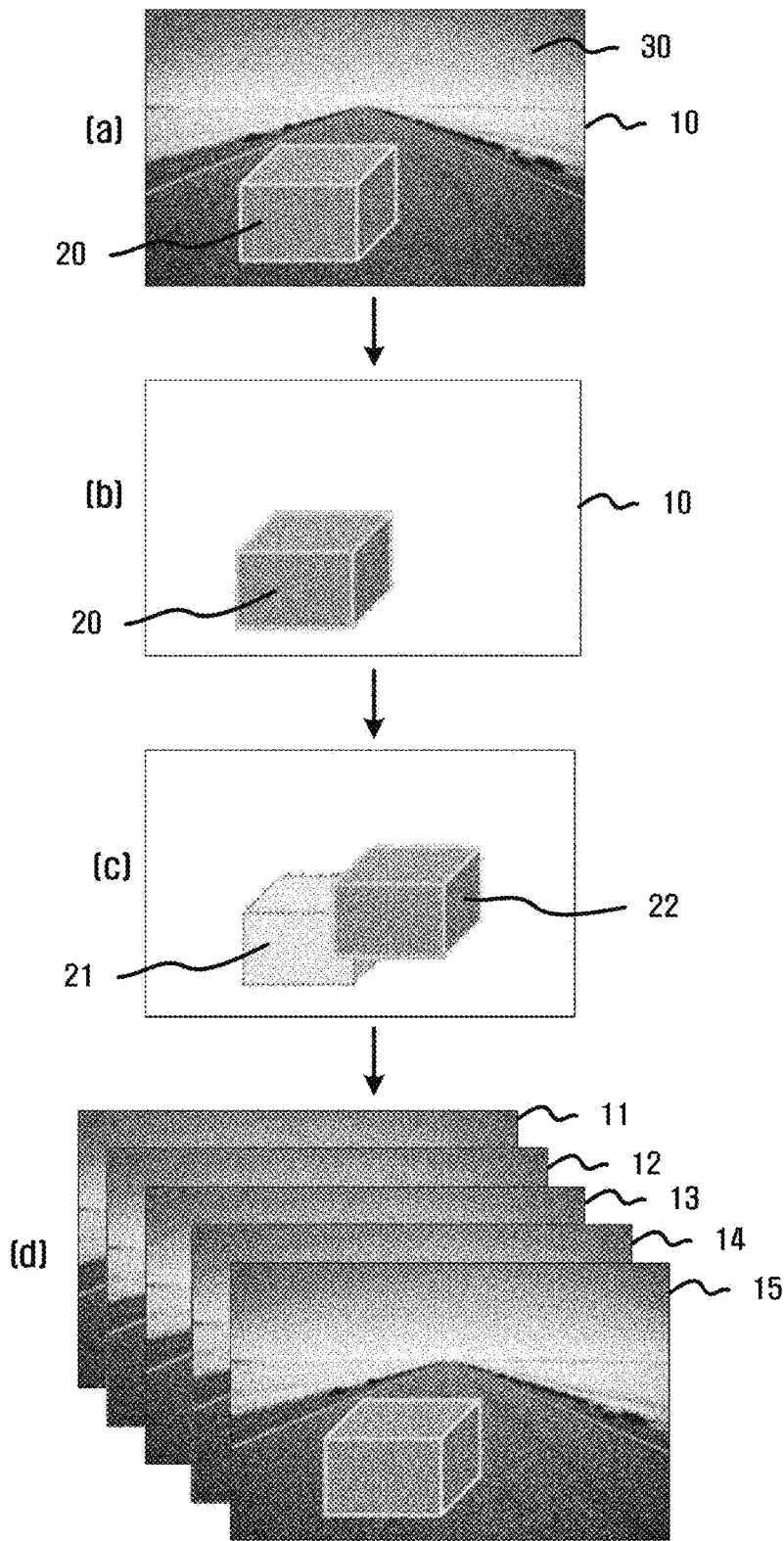
FIG. 4 is a diagram for describing a process of sampling a learning target frame image according to an embodiment of the inventive concept.

FIG. 4 is a diagram for describing a process of sampling a learning target frame image according to an embodiment of the inventive concept.

Referring to FIG. 4, (a) in FIG. 4 illustrates a frame image 10 extracted in the step S200 of extracting a frame image. The frame image 10 includes a learning target object 20 and a background 30.

(b) in FIG. 4 illustrates that the background 30 is removed in the step S400 of removing a background from the frame image 10 in (a) of FIG. 4. The frame image 10 includes only the learning target object 20.

(c) in FIG. 4 illustrates that a location of each of the detected one or more learning target objects 21 in a n-th frame image ('n' is a natural number of 2 or more) is compared with a location of each of the detected one or more learning target objects 22 in a (n-1)-th frame image, from which a background is removed, immediately before the n-th frame image.

A computer may measure a movement amount of a learning target object by comparing the learning target object 21 with the learning target object 22.

When the movement amount of each of the one or more learning target objects 20 among the detected one or more learning target objects 20 is not less than a predetermined reference after the computer measures the movement amount by comparing a location of the learning target object 21 with a location of the learning target object 22, the computer selects the n-th frame image as a learning target frame image. Otherwise, the computer does not select the n-th frame image as the learning target frame image.

In an embodiment, the computer measures a movement amount of a learning target object by comparing a location of a learning target object detected on a first frame image, with a location of a learning target object detected on a second frame image. When the movement amount is not less than the predetermined reference, the computer selects the second frame image as a learning target frame image. When the movement amount is not greater than or equal to the predetermined reference, the computer does not select the second frame image as the learning target frame image.

The step of selecting a learning target frame image may be performed by comparing all the selected and extracted frame images with each other.

In an embodiment, the computer measures a movement amount of a learning target object by again comparing a location of a learning target object detected on the second frame image with a location of a learning target object detected on a third frame image in addition to selecting or not selecting the second frame image as a learning target frame image. When the movement amount is not less than the predetermined reference, the computer selects the third frame image as a learning target frame image.

A step of measuring a movement amount of an object in a frame image and selecting or not selecting the frame image as a learning target frame image refers to comparing a location of each of the detected one or more learning target objects in the n-th frame image (n is a natural number of 2 or more) with a location of each of the detected one or more learning target objects in the (n−1)-th frame image, and is repeated until selecting or not selecting as an image frame of a learning target object by comparing locations of the one or more objects detected in all the extracted frame images are compared with one another is completed.

Moreover, the one or more learning target objects 20 are present. Even when the plurality of learning target objects 20 are present in the frame image 10, the computer measures a movement amount by comparing locations of learning target objects 20 with one another.

When the learning target objects 20 are included in the frame image 10, in an embodiment, the computer measures movement amounts of all of the learning target objects 20. When the movement amount of each of the learning target objects 20, which have the predetermined number, is not less than a predetermined reference, the computer selects the corresponding frame image 10 as a learning target frame image.

In another embodiment, the computer measures movement amounts of all of the learning target objects 20. When each movement amount of all the learning target objects 20 is not less than a predetermined reference, the computer selects the corresponding frame image 10 as a learning target frame image.

In another embodiment, the computer measures only the movement amounts of the learning target objects 20, which have the predetermined number, from among the plurality of learning target objects 20. When each movement amount of the learning target objects 20, which have the predetermined number, from among the measured movement amounts of the learning target objects 20 is not less than the predetermined reference, the computer selects the corresponding frame image 10 as a learning target frame image.

In another embodiment, the computer measures only the movement amounts of the learning target objects 20, which have the predetermined number, from among the plurality of learning target objects 20. When each measured movement amount of all the learning target objects 20 is not less than the predetermined reference, the computer selects the corresponding frame image 10 as a learning target frame image.

As illustrated in (d) of FIG. 4, the learning target frame image selected by measuring the movement amount in (c) of FIG. 4 is selected as learning target frame images 12 and 14 selected from extracted frame images 11, 12, 13, 14, and 15.

Figure 5:
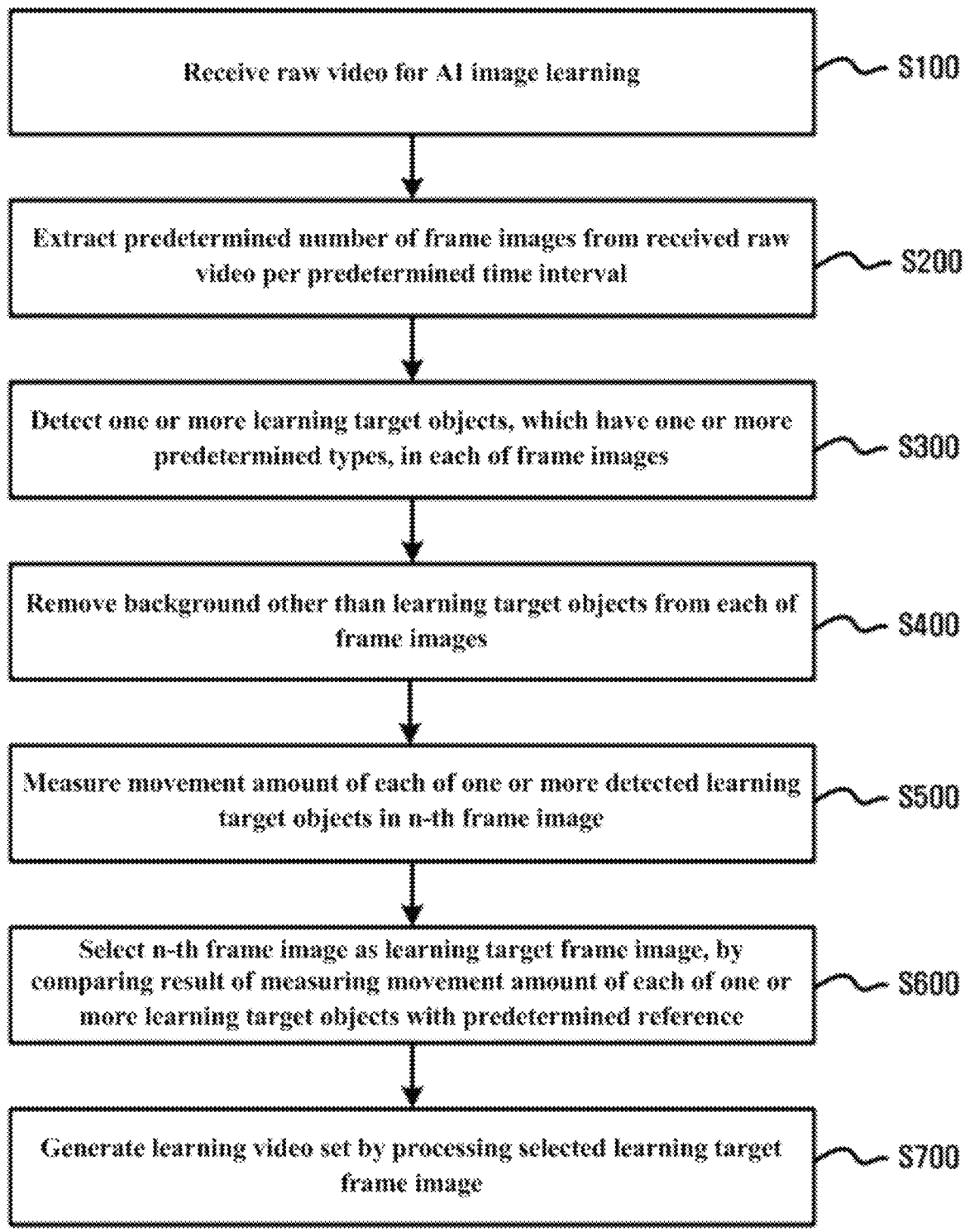
FIG. 5 is a flowchart for describing a method, which includes a step of generating a learning video set and which samples a learning target frame image in a video for AI image learning.

FIG. 5 is a flowchart for describing a method, which includes a step of generating a learning video set and which samples a learning target frame image in a video for AI image learning.

Figure 6:
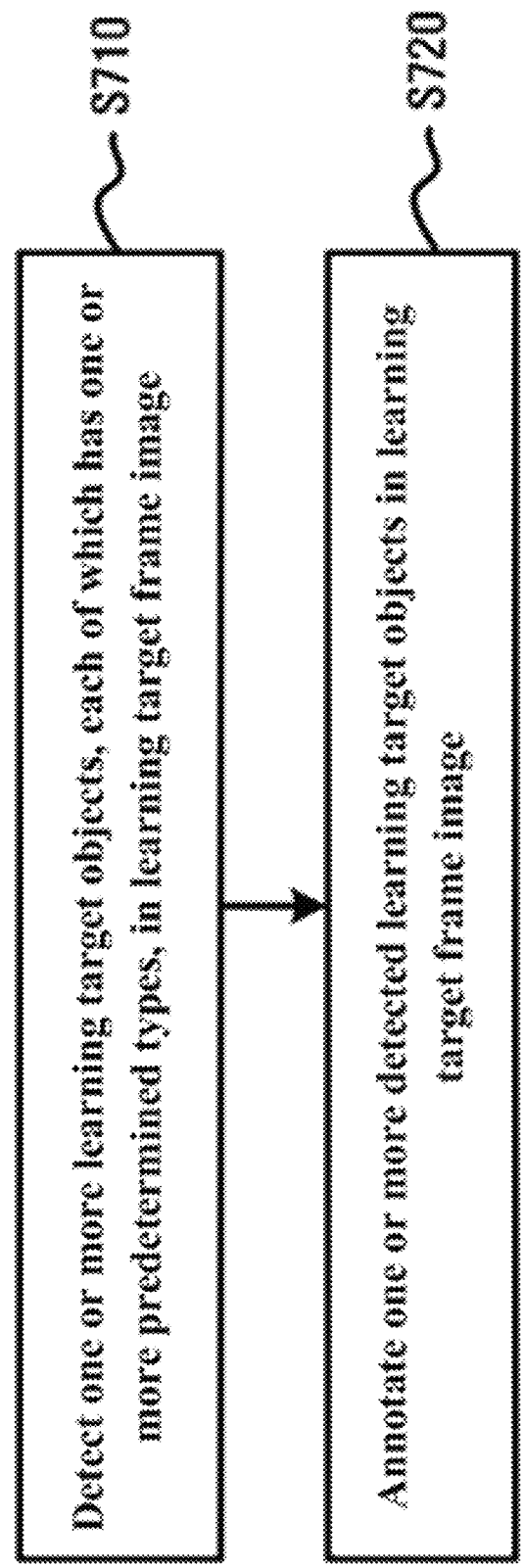
FIG. 6 is a flowchart for describing a step of generating a learning video set when a learning target frame image according to an embodiment of the inventive concept is a frame image before a learning target object is detected.

FIG. 6 is a flowchart for describing a step of generating a learning video set when a learning target frame image according to an embodiment of the inventive concept is a frame image before a learning target object is detected.

Referring to FIG. 5, according to an embodiment of the inventive concept, a method of sampling a learning target frame image in a video further includes a step S700 of generating a learning video set by processing a selected learning target frame image.

In the step S700 of generating the learning video set by processing the selected learning target frame image, the learning target frame image includes a frame image before a learning target object is detected, or a frame image from which a learning target object is detected.

Referring to FIG. 6, the step S700 of generating the learning video set when the learning target frame image is the frame image before the learning target object is detected may include a step S710 of detecting one or more learning target objects, each of which has one or more predetermined types, in a learning target frame image, and a step S720 of annotating the detected one or more learning target objects in the learning target frame image.

The step S710 of detecting the one or more learning target objects, each of which has one or more predetermined types, in the learning target frame image may be applied in the same manner as the step S300 of detecting the learning target object of FIG. 1 described above.

The learning target frame image, which is the frame image before the learning target object is detected and which is processed in the step of detecting the learning target object, may be used for the step of annotating the learning target object in the learning target frame image, which will be processed later, and generating a learning video set by using the annotated learning target object.

In the step S720 of annotating the detected one or more learning target objects in the learning target frame image, the annotating may include labeling, coloring, or layering. All operations for displaying a description of the learning target object may be included as the annotating.

The detected one or more learning target objects in a learning target frame image are displayed in the form of, for example, a box or the like such that areas of the detected one or more objects are distinguished from one another.

Accordingly, with respect to an area displayed while being identified as the learning target object, a description of each object may be written, the labeling may be written simply by using a single word, and may be written in detail by using a sentence, not as a single word.

One or more users may directly make the labeling, and a computer may receive a labeling command from a user and then may make the labeling.

When the user makes the labeling, the user may directly write a description or may select one among a plurality of tabs, as a labeling method.

Besides, when it is determined that an object, which has been previously labeled through learning, is the same as a current object to be labeled, the computer may make the labeling on the current object to be labeled in the same manner as the previous object.

Even when an object is annotated through coloring or layering, one or more users may directly make coloring or layering in the same manner as labeling. The computer may receive a coloring command or a layering command from a user, and then may make the coloring or layering.

Furthermore, when it is determined that an object, which has been previously colored and layered through learning, is the same as a current object to be colored and layered, the computer may make coloring and layering on the current object to be colored and layered in the same manner as the previous object.

In the meantime, when the learning target frame image is a frame image in which one or more learning target objects are detected, the step S700 of generating a learning video set includes the step S720 of annotating the detected one or more learning target objects in the learning target frame image.

The step S720 of annotating the detected one or more learning target objects is the same as described above.

According to another embodiment of the inventive concept, an AI image learning method includes performing AI image learning by using a learning video set. The learning video refers to a learning video generated by a method of sampling a learning target frame image of a video for AI image learning described above.

Accordingly, a method for generating a learning video is applied in the same manner as a method for sampling a learning target frame image of a video for AI image learning described above. The AI image learning method according to another embodiment of the inventive concept performs AI image learning by using the generated learning video set.

According to still another embodiment of the inventive concept, a device for sampling a learning target frame image in a video for AI image learning includes a raw video receiving unit, a frame image extracting unit, a learning target object detecting unit, a background removing unit, an object movement amount measuring unit, and a learning target frame image selecting unit.

The raw video receiving unit receives a raw video for the AI image learning.

The frame image extracting unit extracts a predetermined number of frame images per predetermined time interval from the received raw video.

The learning target object detecting unit detects one or more learning target objects, each of which has one or more predetermined types, in each of the frame images by using an object detection algorithm.

The background removing unit removes a background other than the learning target objects from each of the frame images.

The object movement amount measuring unit measures a movement amount of each of the detected one or more learning target objects in a n-th frame image (e.g., 'n' is a natural number of 2 or more) by comparing a location of each of the detected one or more learning target objects in the n-th frame image, from which the background is removed, with a location of each of the detected one or more learning target objects in a (n−1)-th frame image, from which the background is removed, immediately before the n-th frame image.

The learning target frame image selecting unit compares a result of measuring a movement amount of each of the one or more detected learning target objects in the n-th frame image with a predetermined reference and then selects the n-th frame image as a learning target frame image.

According to yet another embodiment of the inventive concept, the device for sampling a learning target frame image in a video for AI image learning further includes a learning video set generating unit generating a learning video set by processing the selected learning target frame image.

Each configuration of the device for sampling a learning target frame image in a video for AI image learning is applied in the same manner as described in a method of sampling a learning target frame image in a video for AI image learning of FIGS. 1 to 6.

According to yet another embodiment of the inventive concept, an AI image learning device includes an AI image learning executing unit performing AI image learning by using a learning video set. The learning video refers to a learning video generated by the device for sampling a learning target frame image of a video for AI image learning described above.

The steps of a method or algorithm described in connection with the embodiments of the inventive concept may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form known in the art to which the inventive concept pertains.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

According to an embodiment of the inventive concept, in generating learning data of a video, it is possible to minimize a time and cost in a task of preprocessing data by selecting only the part of video data as learning data.

According to an embodiment of the inventive concept, in selecting learning data, unnecessary data may be reduced and only necessary data may be selected.

According to an embodiment of the inventive concept, it is possible to accurately measure the amount of change in a learning target object by separating the learning target object from a background.

The effects of the present inventive concept are not limited to the aforementioned effects, and other effects not mentioned herein will be clearly understood from the following description by those skilled in the art to which the inventive concept pertains.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of sampling a learning target frame image in a video for artificial intelligence (AI) image learning that is performed by a computer, the method comprising:
   receiving a raw video for the AI image learning;
   extracting a predetermined number of frame images from the received raw video per predetermined time interval;
   detecting one or more learning target objects, each of which has one or more predetermined types, in each of the frame images by using an object detection algorithm;
   removing a background other than the learning target objects from each of the frame images;
   measuring a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image;
   selecting the n-th frame image as the learning target frame image, by comparing a result of measuring the movement amount of each of the detected one or more learning target objects in the n-th frame image with a predetermined reference; and
   when the learning target objects are included in the frame image:
      measuring movement amounts of all of the learning target objects, and selecting a corresponding frame image as the learning target frame image when the movement amount of each of the learning target objects, which have the predetermined number, is not less than a predetermined reference or when each movement amount of all of the learning target objects is not less than a predetermined reference; or
measuring only the movement amounts of the learning target objects, which have the predetermined number, from among the plurality of learning target objects, and selecting a corresponding frame image as the learning target frame image when each movement amount of the learning target objects, which have the predetermined number, from among the measured movement amounts of the learning target objects is not less than the predetermined reference or when each measured movement amount of all of the learning target objects is not less than the predetermined reference.

2. The method of claim 1, further comprising:
generating a learning video set by processing the selected learning target frame image.

3. The method of claim 2, wherein the learning target frame image in the generating of the learning video set is a frame image before the one or more learning target objects are detected in the extracting of the predetermined number of the frame images, and
wherein the generating of the learning video set includes:
detecting the one or more learning target objects, each of which has the one or more predetermined types, in the learning target frame image; and
annotating the detected one or more learning target objects in the learning target frame image.

4. The method of claim 2, wherein the learning target frame image in the generating of the learning video set is a frame image, in which the one or more learning target objects are detected in the detecting of the one or more learning target objects, and
wherein the generating of the learning video set includes:
annotating the detected one or more learning target objects in the learning target frame image.

5. A method of artificial intelligence (AI) image learning that is performed by a computer, the method comprising:
performing the AI image learning by using a learning video set;
wherein a learning video is generated by a method of sampling a learning target frame image, which comprises:
receiving a raw video for the AI image learning;
extracting a predetermined number of frame images from the received raw video per predetermined time interval;
detecting one or more learning target objects, each of which has one or more predetermined types, in each of the frame images by using an object detection algorithm;
removing a background other than the learning target objects from each of the frame images;
measuring a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image;
selecting the n-th frame image as the learning target frame image, by comparing a result of measuring the movement amount of each of the detected one or more learning target objects in the n-th frame image with a predetermined reference;
generating the learning video set by processing the selected learning target frame image; and
when the learning target objects are included in the frame image:
measuring movement amounts of all of the learning target objects, and selecting a corresponding frame image as the learning target frame image when the movement amount of each of the learning target objects, which have the predetermined number, is not less than a predetermined reference or when each movement amount of all of the learning target objects is not less than a predetermined reference; or
measuring only the movement amounts of the learning target objects, which have the predetermined number, from among the plurality of learning target objects, and selecting a corresponding frame image as the learning target frame image when each movement amount of the learning target objects, which have the predetermined number, from among the measured movement amounts of the learning target objects is not less than the predetermined reference or when each measured movement amount of all of the learning target objects is not less than the predetermined reference.

6. A device for sampling a learning target frame image in a video for artificial intelligence (AI) image learning, the device comprising:
a raw video receiving unit configured to receive a raw video for the AI image learning;
a frame image extracting unit configured to extract a predetermined number of frame images from the received raw video per predetermined time interval;
a learning target object detecting unit configured to detect one or more learning target objects, each of which has one or more predetermined types, in each of the frame images by using an object detection algorithm;
a background removing unit configured to remove a background other than the learning target objects from each of the frame images;
an object movement amount measuring unit configured to measure a movement amount of each of the detected one or more learning target objects in a n-th frame image ('n' being a natural number of 2 or more) by comparing a location of each of the detected one or more learning target objects in the n-th frame image, from which the background is removed, with a location of each of the detected one or more learning target objects in a (n−1)-th frame image, from which the background is removed and which is immediately before the n-th frame image;
a learning target frame image selecting unit configured to select the n-th frame image as the learning target frame image, by comparing a result of measuring the movement amount of each of the detected one or more learning target objects in the n-th frame image with a predetermined reference; and
when the learning target objects are included in the frame image:
the object movement amount measuring unit is further configured to measure movement amounts of all of the learning target objects, and the learning target frame image selecting unit is further configured to select a corresponding frame image as the learning target frame image when the movement amount of each of the learning target objects, which have the predetermined number, is not less than a predetermined reference or when each movement amount of all of the learning target objects is not less than a predetermined reference; or the object movement amount measuring unit is further configured to measure only the movement amounts of the learning target objects, which have the predetermined number, from among the plurality of learning target objects, and the learning target frame image selecting unit is further configured to select a corresponding frame image as the learning target frame image when each movement amount of the learning target objects, which have the predetermined number, from among the measured movement amounts of the learning target objects is not less than the predetermined reference or when each measured movement amount of all of the learning target objects is not less than the predetermined reference.

7. The device of claim 6, further comprising:
a learning video set generating unit configured to generate a learning video set by processing the selected learning target frame image.

\* \* \* \* \*